Patented June 12, 1934

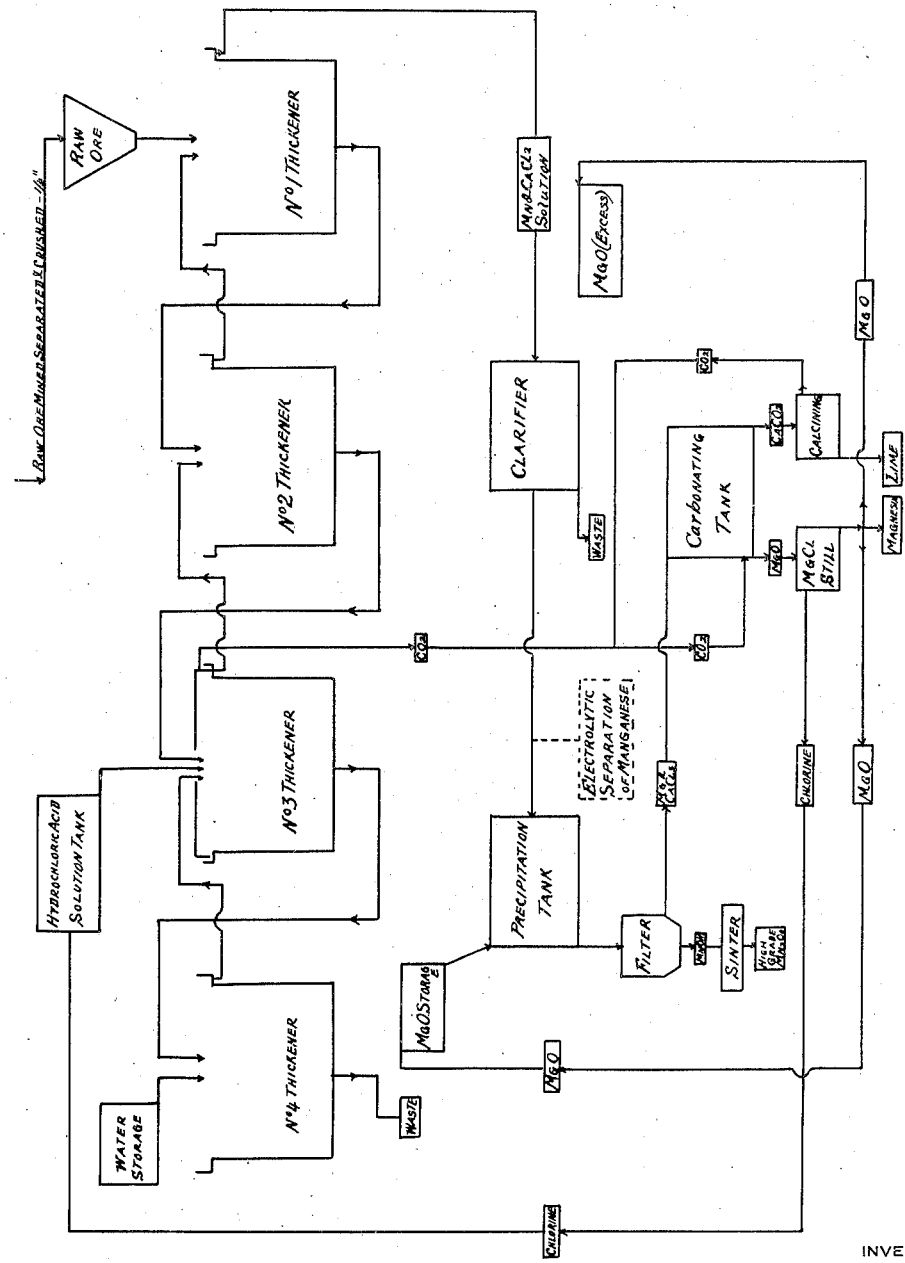

1,962,160

UNITED STATES PATENT OFFICE 1,962,160

PROCESS OF EXTRACTING MANGANESE FROM ORE

Andrew T. Sweet, Houghton, and John D. Mac-Carthy, Detroit, Mich., assignors to General Manganese Corporation, Detroit, Mich., a corporation of Delaware Application April 29, 1929, Serial No. 359,155
Renewed August 18, 1933

25 Claims. (Cl. 75—18)

The invention relates to an improved process for separating manganese from its ore, particularly the low grade ores wherein the manganese is associated with relatively large amounts of other materials.

Among the objects of the invention are the following:

First, to devise an economical process that can be applied to available manganese deposits and obtain therefrom at a reasonable cost a manganese product in a commercial form.

Second, to provide a process for obtaining relatively pure manganese oxide free from those impurities which are detrimental in metallurgical processes utilizing the manganese product.

Third, to provide a process for beneficiating certain manganese bearing materials which heretofore have not been amenable to known methods of treatment.

Fourth, to obtain manganese from complex carbonate ores, mangano-siderites and the like.

Fifth, to obtain an efficient method for the separation of manganese from iron in an economical manner.

Sixth, to obtain manganese from its ores in a form practically free from phosphorus.

Seventh, to obtain a chemical process for the separation of manganese from the other materials associated in the ore.

Eighth, to obtain a chemical process resulting in by-products of commercial value.

While in the broader aspects our invention deals with the separation of manganese from other materials such as iron which are ordinarily associated with the manganese in the manganese bearing materials, our invention is particularly applicable to the extraction of manganese from low grade ores such as the complex carbonate ores, mangano-siderites, etc., and in the following detailed description reference will be made to an ore which after being separated from shale assays approximately as follows:

| | Per cent |
|---|---|
| Mn | 10 –20 |
| Fe | 8 –13 |
| CaO | 12 –20 |
| $Al_2O_3$ | 1.5– 2.5 |
| MgO | 1.5– 2.5 |
| $SiO_2$ | 13 |
| P | 0.4– 0.7 |
| S | .05 |

The accompanying drawing discloses a flow sheet for one process of extracting an ore of the above analysis.

The main feature of our invention resides in those steps of the process wherein the manganese is extracted from the ore and separated from most of the other materials in the ore by a differential leaching process. Our invention contemplates the processing of the crushed ore material through a counter current decantation utilizing a soluble chloride leach. The ore is fed to the first leaching tank of a series, the number of tanks of which depends on the richness of the ore and the amount of manganese in the tailing of the series. The solid material settling to the bottom of the first tank is delivered to the second tank and that from the second tank is delivered to the third tank and so on until the tailing from the last tank is practically free from manganese. Water is introduced into the last tank and the overflow processed successively to the other tanks of the series and is withdrawn from the first tank. The soluble chloride, which preferably is a solution of chlorine gas or hydrochloric acid, is introduced into one of the intermediate tanks of the series. The object of the process is to render the manganese in a soluble form and to effect a separation of the manganese from the iron and the less soluble impurities in the ore. Since the iron compounds in the ore are normally soluble in hydrochloric acid the success of our process depends upon maintaining the proper concentrations so as to preferentially dissolve the manganese and leave the iron substantially undissolved. We have discovered that a differential leach can be carried out with an ore of the above mentioned analysis by maintaining the concentration of the hydrochloric acid in the first tank of the series not in excess of 1%. The introduction of raw ore at this point causes a precipitation of any soluble iron compounds.

In some instances it may be desirable to permit a certain percentage of iron to be extracted with the manganese and the amount of iron in the leach can be controlled by controlling the relative concentrations of the ore and the acid in the first tank. The amount of manganese extracted from the ore is determined by the number of tanks in the series and also by the concentration of the acid in the last tank. The minimum amount of hydrochloric acid or other soluble chloride introduced is that which will not permit any substantial amount of manganese to go into the tailing.

While our process is not necessarily carried out in any particular type of apparatus, that which seems to be best suited from a commercial standpoint is a series of Dorr tanks or thickeners. Since this apparatus is well known in various ore extracting industries, a detailed description of the same will not be entered into in this application.

With the ore of the above analysis the solution withdrawn from the No. 1 thickener, illustrated in the flow sheet, contains chiefly manganese and calcium chloride solutions. This solution after passing through a clarifier may be further treated to obtain a separation of the manganese in various different ways. The manganese may be separated electrolytically by utilizing a carbon electrode multiple cell electrolytic apparatus. This treatment is indicated diagrammatically on the flow sheet by the dotted line.

Another method of separating the manganese depends upon a chemical separation and is illustrated in full lines on the flow sheet. The manganese chloride and calcium chloride solution is passed to a precipitation tank in which magnesium oxide is introduced. The manganese is thus precipitated and may be filtered from the solution as manganese hydroxide which when roasted in a furnace results in a high grade manganese sinter approximating $Mn_3O_4$. The filtrate from the precipitation tank contains magnesium chloride and calcium chloride and to preserve these products they are passed to a carbonating tank where an excess of magnesium oxide is added, together with carbon dioxide gas. This forms calcium carbonate which may be calcined to produce lime and the carbon dioxide gas collected and fed back into the carbonating tank. The magnesium chloride in the filtrate may be subjected to distillation, thereby obtaining magnesia and free chlorine gas. The magnesia is then available for the precipitation step of the process, while the chlorine is available for introduction into the counter current decantation process. Thus with the arrangement specified the process may be carried out with very little cost for chemical reagents since the by-products of the process can be utilized in this capacity.

While the process as above described has indicated that a soluble chloride was the preferred solvent for the preferential extraction of the manganese, our invention is not to be construed as limited to this solvent as there are other reagents which can be used in carrying out our separation. For example, it is possible to extract manganese by a sulphuric acid leach providing the concentrations are maintained in the proper relationship. It should be noted that where an excess of sulphuric acid is used soluble compounds will be formed with the iron, manganese and magnesium in the ore, whereas an insoluble compound is formed with the calcium. We have discovered, however, that the manganese may be separated from the iron by maintaining a sufficient proportion of the ore in the No. 1 thickener, this resulting in a preferential solution of the manganese sulphate over the iron sulphate.

In the broader aspects of our invention it includes the use of soluble chlorides and soluble sulphates as leaching materials and also other similar solvents which normally would dissolve manganese and also other impurities in the ore but which under proper control of concentration will cause a separation of the manganese from one or more of the less readily soluble metallic impurities.

What we claim as our invention is:

1. The process of extracting manganese which consists in treating manganese carbonate ore with a solvent for manganese and maintaining the concentration of the solvent below a predetermined amount at the point of separation of the solvent and solid, thereby controlling the amount of material other than manganese dissolved in the solvent.

2. The process of extracting manganese which consists in treating manganese carbonate ore with a soluble chloride and maintaining the concentration of the soluble chloride below a predetermined amount at the point of separation of the liquid from the solid material, thereby controlling the amount of chloride soluble material other than manganese dissolved in the liquid.

3. The process of extracting manganese which consists in treating manganese carbonate ore with hydrochloric acid and maintaining the concentration of the hydrochloric acid below a predetermined amount at the point of separation of the solution and the solid matter, thereby controlling the amount of chlorides other than manganese contained in the solution.

4. The process of extracting manganese from manganese carbonate ore containing iron which consists in treating the material with a soluble chloride and maintaining the concentration of the chloride below a predetermined amount at the point of separation of the solution and the solid matter, thereby controlling the amount of iron chloride in the solution.

5. The process of extracting manganese which consists in treating the manganese bearing ore with a solvent for both manganese and an impurity in the ore, separating the manganese from the impurity by providing relative concentrations of ore and solvent such as to maintain the manganese in solution and maintain said impurity out of solution and separating the solution from the solid matter.

6. The process of extracting manganese which consists in treating manganese carbonate ore with a soluble chloride and in separating manganese from another metal associated therewith by maintaining the concentration of the ore and the soluble chloride such as to preferentially dissolve manganese leaving the aforesaid other metal undissolved and separating the manganese solution from the solid matter.

7. The process of extracting manganese which consists in treating manganese carbonate ore with a hydrochloric acid leach and maintaining the concentration of the ore and acid such as to preferentially dissolve manganese leaving another metallic impurity undissolved.

8. The process of extracting manganese which consists in subjecting manganese bearing ore to counter current decantation, utilizing a soluble chloride leach and in maintaining the proportion of chloride to ore at the out-flow of the leaching solution such as to dissolve the manganese preferentially over another metallic compound.

9. The process of extracting manganese which consists in treating manganese carbonate ore with a solvent for both manganese and iron and in separating the manganese from the iron by providing sufficient concentration of said manganese carbonate ore to keep the iron out of solution to any substantial extent while converting the manganese into soluble form and separating the solution from the solid matter.

10. The process of extracting manganese which consists in treating manganese carbonate ore with a soluble chloride and in separating manganese from iron by maintaining a sufficient concentration of manganese carbonate ore to maintain the iron substantially insoluble and the manganese soluble.

11. The process of extracting manganese which consists in treating manganese bearing ore with hydrochloric acid and maintaining the concentration of the acid sufficiently low to prevent solution of the iron and render the manganese soluble.

12. The process of extracting manganese which consists in subjecting manganese carbonate ore to counter current decantation, utilizing a soluble chloride leach, maintaining the concentration of the chloride at the out-flow of the leach sufficiently low to prevent substantial solution of the iron and in maintaining the concentration of the leach at the out-go of the solid materials such as to extract substantially all of the manganese from the manganese carbonate ore.

13. The process of extracting manganese which consists in treating manganese carbonate ore to a hydrochloric acid leach and maintaining the concentration of the acid less than 1% at the point where the leach is withdrawn from the ore.

14. The process of extracting manganese from a carbonate ore containing the same consisting in first separating the manganese from the iron by a chloride leach in a counter current decantation apparatus and in subsequently separating the manganese from other soluble compounds contained in the leach.

15. The process of extracting manganese from a carbonate ore containing the same which consists in subjecting the ore to a counter current decantation process in which hydrochloric acid is employed as a leach, maintaining the concentration of the hydrochloric acid sufficiently low to maintain the iron substantially insoluble, thereby separating the manganese from the greater part of the iron and in subsequently separating the manganese from the other compounds soluble in said hydrochloric acid leach.

16. The process of extracting manganese which consists in subjecting manganese carbonate ore containing manganese, iron, lime and silica to countercurrent decantation, utilizing as a leach a solvent for both manganese and iron and maintaining the concentration of said solvent at the out-flow of the leach sufficiently low by adding ore thereto whereby solution of the iron is substantially prevented.

17. The process of extracting manganese which consists in subjecting manganese carbonate ore containing manganese, iron, lime and silica to countercurrent decantation, utilizing as a leach a soluble chloride and maintaining the concentration of said chloride at the out-flow of the leach sufficiently low by adding ore thereto whereby solution of the iron is substantially prevented.

18. The process of extracting manganese which consists in treating manganese carbonate ore with an inorganic soluble material containing an acid radical and maintaining the concentration of said soluble material below a predetermined amount at the point of separation of the liquid from the solid material, thereby controlling the amount of material other than manganese dissolved in the liquid.

19. The process of extracting manganese which consists in treating manganese carbonate ore with an inorganic soluble material containing an acid radical and in separating manganese from another metal associated therewith by maintaining the concentration of the ore and said soluble material such as to preferentially dissolve manganese, leaving the aforesaid other metal undissolved and separating the manganese solution from the solid matter.

20. The process of extracting manganese comprising treating manganese carbonate ore with a reagent of the class comprising soluble chlorides and sulphates and maintaining the concentration of the soluble reagent below a predetermined amount at the point of separation of the liquid from the solid material, thereby controlling the amount of reagent-soluble material other than manganese dissolved in the liquid.

21. The process of extracting manganese comprising treating the manganese-bearing material with a reagent of the class comprising strong inorganic acids and the soluble salts thereof having a preferential soluble action on manganese and maintaining the concentration of the soluble reagent below a predetermined amount at the point of separation of the liquid from the solid material, thereby controlling the amount of reagent-soluble material other than manganese dissolved in the liquid.

22. The process of extracting manganese comprising treating manganese-bearing material with a reagent of the class comprising soluble chlorides and sulphates and in separating manganese from iron by maintaining a sufficient concentration of manganese-bearing material to maintain the iron substantially insoluble and the manganese soluble.

23. The process of extracting manganese from carbonate ores containing manganese, iron and an alkaline earth metal compound comprising digesting said manganese ore with a reagent of the class comprising soluble chlorides and soluble sulphates and separating manganese from iron by maintaining a sufficient concentration of said ore to maintain the iron substantially insoluble and the manganese soluble.

24. The process of extracting manganese from carbonate ores containing manganese, iron and an alkaline earth metal compound comprising digesting said manganese ore with a soluble chloride and separating manganese from iron by maintaining a sufficient concentration of said ore to maintain the iron substantially insoluble and the manganese soluble.

25. The process of obtaining a soluble manganese compound from a carbonate ore containing manganese, iron and alkaline earth metal compounds comprising digesting said carbonate ore with a reagent of the class comprising soluble chlorides and soluble sulphates and maintaining a sufficient concentration of said ore to maintain the iron in the form of an insoluble iron compound and separating the solution containing a soluble manganese compound from the insoluble material.

ANDREW T. SWEET.
JOHN D. MacCARTHY.